US010247633B2

(12) United States Patent
Shibata et al.

(10) Patent No.: US 10,247,633 B2
(45) Date of Patent: Apr. 2, 2019

(54) COMBUSTION PRESSURE SENSOR WITH BUILT-IN CHARGE AMPLIFIER

(71) Applicant: DENSO CORPORATION, Kariya, Aichi-pref. (JP)

(72) Inventors: Takayuki Shibata, Kariya (JP); Kouji Ooya, Kariya (JP)

(73) Assignee: DENSO CORPORATION, Kariya (JP)

( * ) Notice: Subject to any disclaimer, the term of this patent is extended or adjusted under 35 U.S.C. 154(b) by 162 days.

(21) Appl. No.: 15/103,032

(22) PCT Filed: Jan. 12, 2015

(86) PCT No.: PCT/JP2015/000095
§ 371 (c)(1),
(2) Date: Jun. 9, 2016

(87) PCT Pub. No.: WO2015/111380
PCT Pub. Date: Jul. 30, 2015

(65) Prior Publication Data
US 2016/0305840 A1 Oct. 20, 2016

(30) Foreign Application Priority Data
Jan. 22, 2014 (JP) .................. 2014-009458

(51) Int. Cl.
*G01L 23/10* (2006.01)
*G01L 19/06* (2006.01)
*G01L 23/22* (2006.01)

(52) U.S. Cl.
CPC .......... *G01L 23/10* (2013.01); *G01L 19/0681* (2013.01); *G01L 23/22* (2013.01)

(58) Field of Classification Search
CPC ...................................................... G01L 23/10
USPC ....................................................... 73/35.13
See application file for complete search history.

(56) References Cited

U.S. PATENT DOCUMENTS

2001/0052337 A1* 12/2001 Suzuki ................... G01L 23/10
123/435

FOREIGN PATENT DOCUMENTS

| JP | 2001-208635 A | 8/2001 |
| JP | 2009-115484 A | 5/2009 |
| JP | 2013-156171 A | 8/2013 |

* cited by examiner

Primary Examiner — John Fitzgerald
Assistant Examiner — Rodney T Frank
(74) Attorney, Agent, or Firm — Posz Law Group, PLC

(57) ABSTRACT

In a combustion pressure sensor having built-in charge amplifier, signal line overheating and deterioration of detection accuracy is restricted. The combustion pressure sensor includes a sensor body that includes a piezoelectric element having one end connected to chassis ground through a housing and detects pressure in a combustion chamber of engine, and a charge amplifier that includes at least a voltage converting unit converting output of the sensor body into voltage signal and a reference voltage generating unit generating reference voltage supplied to the voltage converting unit and operates on power supplied from a signal processing unit disposed outside. The reference voltage generating unit includes a voltage generating circuit having a constant current circuit and a resistor connected in series. The voltage generating circuit has one end connected to power line extending from the signal processing unit, and the other end connected to the end of the piezoelectric element.

6 Claims, 5 Drawing Sheets

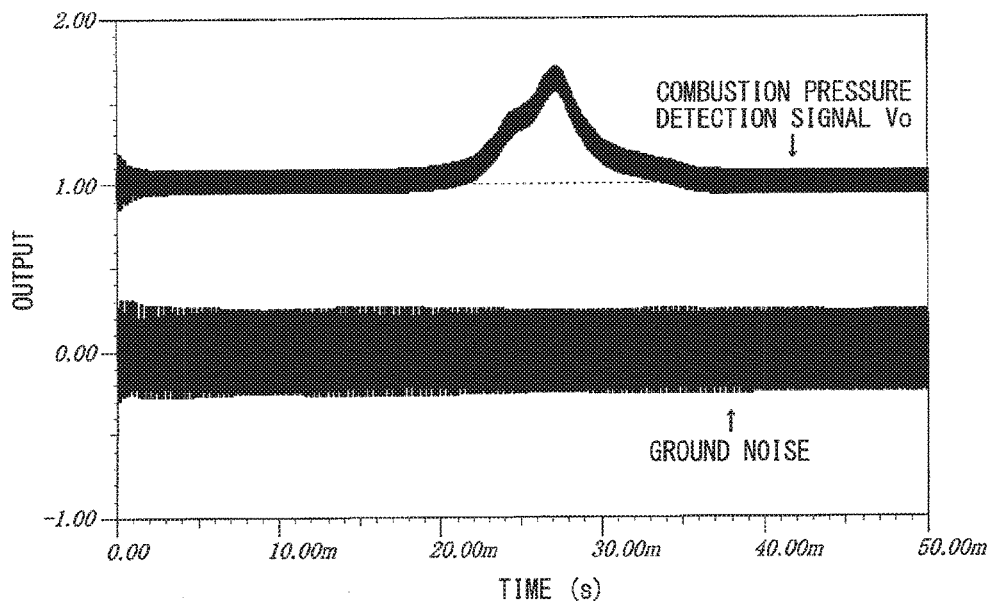
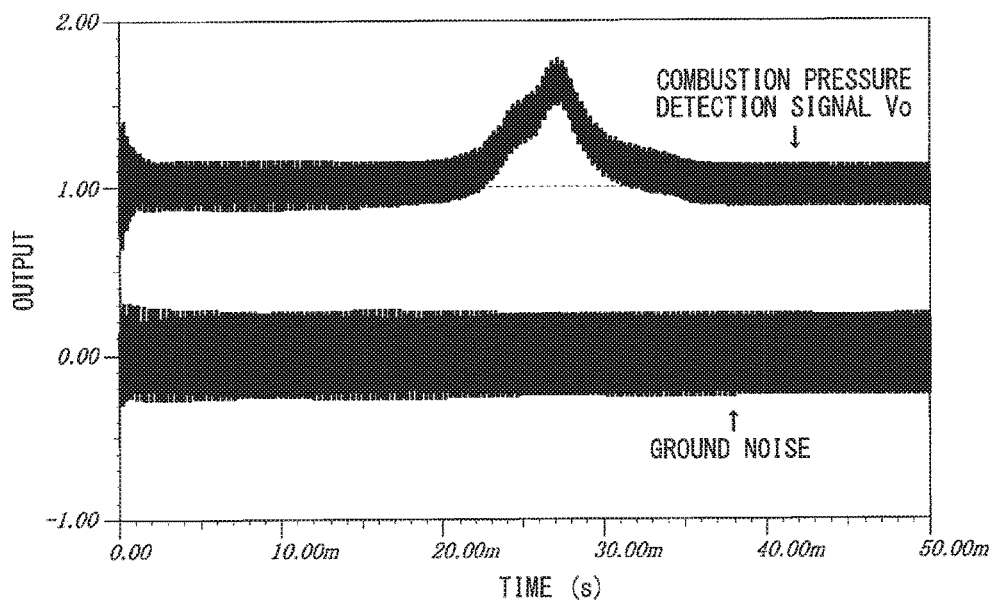

COMBUSTION PRESSURE SENSOR WITH BUILT-IN CHARGE AMPLIFIER

CROSS REFERENCE TO RELATED APPLICATIONS

This application is a U.S. national stage application of International Patent Application No. PCT/JP2015/000095 filed on Jan. 12, 2015 and is based on Japanese Patent Application No. 2014-9458 filed on Jan. 22, 2014, the disclosures of which are incorporated herein by reference.

TECHNICAL FIELD

The present disclosure relates to a combustion pressure sensor having a charge amplifier built in a housing.

BACKGROUND

A combustion pressure sensor including a piezoelectric element has been conventionally known as one of combustion pressure sensors detecting a pressure (i.e., a combustion pressure) in a combustion chamber of an engine. In this type of the combustion pressure sensor, a charge amplifier detects generated charges of the piezoelectric element as detection outputs (for example, see patent literature 1).

PATENT LITERATURE

Patent literature 1: JP 2009-115484 A

SUMMARY

Generally, the charge amplifier is provided integrally with an in-vehicle computer that performs a processing using a combustion pressure detection signal. In this case, a heat-resisting coaxial line or the like needs to be employed as a wiring between the combustion pressure sensor and the in-vehicle computer. However, since the heat-resisting coaxial line is expensive, it can be considered to build the charge amplifier in a housing of the combustion pressure sensor, in order to omit the heat-resisting coaxial line.

When a crystal is employed as the piezoelectric element, due to a structure of the piezoelectric element, an end (i.e., a ground side end) of the piezoelectric element needs to be connected to the housing of the combustion pressure sensor. The housing of the combustion pressure sensor is in contact with a housing of the engine to be connected to a chassis ground. That is, since a ground line for a signal of the charge amplifier needs to be connected to the ground side end of the piezoelectric element, the ground line is necessarily connected to the chassis ground.

As a result, there is a possibility that a disconnection of an electric wire (especially, the ground line) between the combustion pressure sensor and the in-vehicle computer cannot be detected in the combustion pressure sensor with the built-in charge amplifier. The disconnection cannot be detected because the combustion pressure sensor and the in-vehicle computer are connected through the chassis ground, even when the electric wire is disconnected.

An apparatus requiring high electric power such as a starter is connected to an engine side. When the apparatus operates, a potential of the chassis ground of the engine side increases. As a result, there is a possibility that a difference of potentials is generated between a ground (i.e., an ECU ground) of the in-vehicle computer and the ground (i.e., the chassis ground) of the combustion pressure sensor and a large current flows in the ground line of the electric wire to overheat the ground line.

To solve such possibilities, it can be considered to arrange a capacitor between the ground (i.e., the ECU ground) of the charge amplifier and the ground side end (i.e., the chassis ground) of the piezoelectric element, in the combustion pressure sensor. In this case, however, there are possibilities that low frequency components are not sufficiently reflected to the detection signal of the combustion pressure sensor and that a detection accuracy deteriorates when the potential of the chassis ground is changed. To address such possibilities, it can be also considered to enlarge a capacity of the capacitor in order to allow the low frequency components to pass through. In this case, however, there is a possibility that noise components having the same frequency band as the signal component are superimposed on the ECU ground through the chassis ground.

The present disclosure is made in views of the above issues and it is an object of the present disclosure to provide a technique restricting overheating of a signal line and deterioration of a detection accuracy of a combustion pressure in a combustion pressure sensor having a built-in charge amplifier.

According to an aspect of the present disclosure, a combustion pressure sensor with a built-in charge amplifier includes a sensor body and a charge amplifier. The sensor body includes a piezoelectric element having a ground side end connected to a chassis ground through a housing, and detects a pressure in a combustion chamber of an engine. The charge amplifier includes at least a voltage converting unit and a reference voltage generating unit. The voltage converting unit converts an output of the sensor body into a voltage signal and outputs the voltage signal. The reference voltage generating unit generates a reference voltage for being supplied to the voltage converting unit. The reference voltage generating unit includes a voltage generating circuit having a constant current circuit and a resistor connected in series with each other. One end of the voltage generating circuit is connected to a power supply line extending from the signal processing unit, and the other end of the voltage generating circuit is connected to the ground side end of the piezoelectric element.

According to the above structure, even when a potential of the chassis ground varies due to, for example, an operation of an apparatus requiring large electricity in an engine side, the voltage generating circuit generates the reference voltage based on the chassis ground as a reference. Therefore, the voltage converting unit can accurately convert the output of the sensor body, which is generated based on the potential of the chassis ground, into the voltage signal.

The present disclosure can be implemented in various ways other than the above described combustion pressure sensor with the built-in charge amplifier, such as a system including the combustion pressure sensor with the built-in charge amplifier as an element.

BRIEF DESCRIPTION OF DRAWINGS

The above and other objects, features and advantages of the present disclosure will become more apparent from the following detailed description made with reference to the accompanying drawings, in which:

FIG. 3A is a graph illustrating a result of a simulation indicating a noise suppression effect of the combustion pressure sensor with the built-in charge amplifier of the first embodiment;

FIG. 3B is a graph illustrating a result of a simulation of a combustion pressure sensor with a built-in charge amplifier of a comparative example of the first embodiment shown in FIG. 3A;

DETAILED DESCRIPTION

Figure 1:
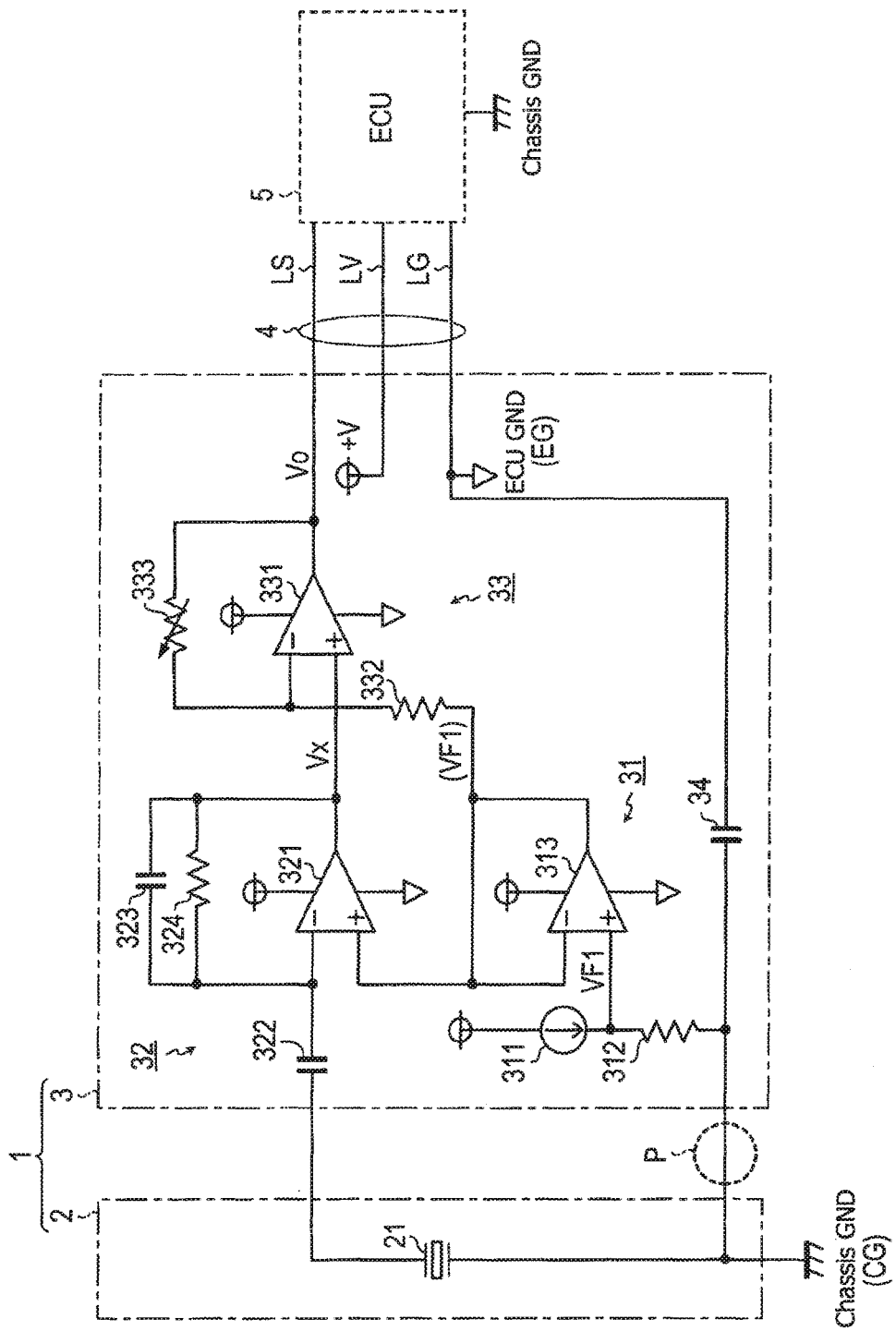
FIG. 1 is a circuit diagram illustrating a structure of a combustion pressure sensor with a built-in charge amplifier of a first embodiment.

Embodiments of the present disclosure will be described hereinafter with reference to the drawings.

First Embodiment

<Entire Structure>

A combustion pressure sensor 1 having a built-in charge amplifier (hereinafter, simply referred to as "a combustion pressure sensor") is employed in a state being attached on a combustion chamber of an engine. The combustion pressure sensor 1 receives power supply through a wire harness 4 from an ECU 5 controlling the engine. The combustion pressure sensor 1 outputs a detection signal indicating a pressure (i.e., a combustion pressure) inside of the combustion chamber by a voltage.

The wire harness 4 includes three lines of a power line LV, a ground line LG and a signal line LS twisted together. The ground line LG is also referred to as an ECU ground. The ground line LG is connected to a chassis ground through a housing of the ECU 5.

The combustion pressure sensor 1 includes a sensor body 2 and a charge amplifier 3.

The sensor body 2 includes a piezoelectric element 21 (for example, a crystal) that converts a pressure to an electric signal. One end (hereinafter, referred to as "a ground side end") is connected to the chassis ground through a housing of the combustion pressure sensor 1 and the housing of the engine. The other end of the piezoelectric element 21 is connected to the charge amplifier 3 that is integrally provided in the housing of the combustion pressure sensor 1.

The charge amplifier 3 includes a reference voltage generating unit 31, a voltage converting unit 32, an amplifying unit 33 and a ground separating capacitor 34.

The ground separating capacitor 34 is connected between the ground line LG (the ECU ground) and the ground side end of the piezoelectric element 21 (i.e., the housing of the combustion pressure sensor 1). That is, in the combustion pressure sensor 1, the ECU ground is connected to the chassis ground close to the engine through the ground separating capacitor 34.

The reference voltage generating unit 31 includes a constant current circuit 311 that applies a predetermined constant current, a resistor 312 that converts the constant current into a voltage, and an operational amplifier 313, an inverted input terminal and an output terminal of which are connected to form a voltage follower circuit. The constant current circuit 311 is connected in series with the resistor 312 to form a voltage generating circuit. A connection end, to which the constant current circuit 311 and the resistor 312 are commonly connected, is connected to a non-inverted input terminal of the operational amplifier 313. An end of the voltage generating circuit adjacent to the constant current circuit 311 is connected to the power line LV. An end of the voltage generating circuit adjacent to the resistor 312 is connected to the ground side end of the piezoelectric element 21 (i.e., the housing of the combustion pressure sensor 1). That is, the end of the voltage generating circuit adjacent to the resistor 312 is connected to the end of the ground separating capacitor 34 adjacent to the chassis ground. Accordingly, the reference voltage generating unit 31 can generate a constant reference voltage VF1 based on the chassis ground as a reference, even when the potential of the chassis ground varies. The reference voltage VF1 is supplied to the voltage converting unit 32 and the amplifying unit 33 thorough the voltage follower circuit.

Figure 2A:
FIG. 2A is an explanatory diagram for exemplifying a specific structure of a constant current circuit.
Figure 2B:
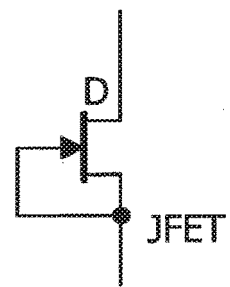
FIG. 2B is an explanatory diagram for exemplifying a specific structure of the constant current circuit.
Figure 2C:
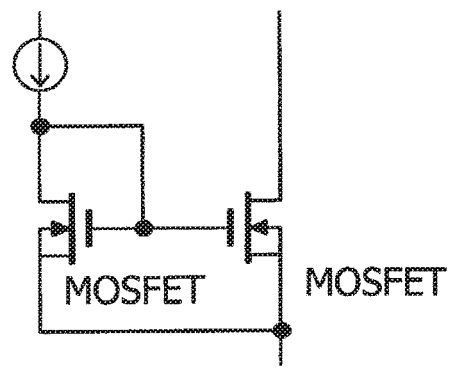
FIG. 2C is an explanatory diagram for exemplifying a specific structure of the constant current circuit.

Specifically, as shown in FIG. 2A, a constant current diode (CRD) may be employed as the constant current circuit 311. As shown in FIG. 2B, a junction FET (JFET) may be employed as the constant current circuit 311. A structure from the constant current circuit 311 to the resistor 312 may be formed so that the constant current is supplied directly. As shown in FIG. 2C, the structure from the constant current circuit 311 to the resistor 312 may be formed so that the constant current is supplied through a current mirror circuit.

The voltage converting unit 32 includes an operational amplifier 321, capacitors 322 and 323, and a resistor 324. The operational amplifier 321 has a non-inverted input terminal to which an output (i.e., the reference voltage VF1) of the reference voltage generating unit 31 is applied. The operational amplifier 321 has an inverted input terminal to which an output of the sensor body 2 is applied through the capacitor 322. The capacitor 323 and the resistor 324 are connected in parallel between the inverted input terminal and an output terminal of the operational amplifier 321. The operational amplifier 321 forms a well-known integrating circuit that converts the charge generated in the piezoelectric element 21 into a voltage (i.e., a conversion voltage Vx) and outputs the conversion voltage Vx.

The amplifying unit 33 includes an operational amplifier 331, a resistor 332, and a variable resistor 333. The operational amplifier 331 has a non-inverted input terminal to which the conversion voltage Vx outputted from the voltage converting unit 32 is applied. The operational amplifier 331 has an inverted input terminal to which the reference voltage VF1 outputted from the reference voltage generating unit 31 is applied through the resistor 332. The variable resistor 333 is connected between the inverted input terminal and an output terminal of the operational amplifier 331. The operational amplifier 331 forms a well-known non-inverting amplifier circuit that amplifies the output of the voltage converting unit 32 at a suitable amplifying rate to output a detection signal Vo having a specific sensitivity (i.e., a ratio of voltage to pressure, voltage/pressure). The amplifying unit 33 is formed so that the sensitivity of the amplifying unit 33 can be adjusted by the variable resistor 333.

Each of the operational amplifiers 313, 321 and 331 has a positive power input terminal connected to the power line LV, and a negative power input terminal connected to the ground line LG. Each of the operational amplifiers 313, 321 and 331 operates based on the ECU ground as a reference.

<Effects>

In the combustion pressure sensor 1, the ECU ground and the chassis ground is separated by the ground separating capacitor 34. Therefore, the ECU 5 can detect the disconnection of the ground line LG based on the difference of the potentials between the signal line LS and the ground line LG, that is, based on the signal level of the detection signal Vo.

In the combustion pressure sensor 1, the signals that are inputted into the inverted input terminal and the non-inverted input terminal of the operational amplifier 321 included in the voltage converting unit 32 are generated based on the same ground (i.e., the chassis ground) as a reference. Even when the potential of the chassis ground close to the engine varies, the effect on the conversion voltage Vx outputted from the voltage converting unit 32 can be restricted. That is, a common mode noise entering from the chassis ground can be restricted.

FIG. 3A and FIG. 3B show results of simulations for the detection signal Vo outputted from the combustion pressure sensor 1 when the noise is applied to the ECU ground. FIG. 3A shows the result when the combustion pressure sensor 1 of the present embodiment is employed. FIG. 3B shows the result when a capacitor is arranged at a portion surrounded by a dotted line P in FIG. 1, instead of the ground separating capacitor 34. That is, FIG. 3B shows the result when the reference voltage generating unit 31 generates the reference voltage based on the ECU ground as a reference instead of the chassis ground. The results indicate that the noise is sufficiently restricted in the present embodiment.

Second Embodiment

Since basic structures in the second embodiment are similar to those of the first embodiment, descriptions of the structures that are common in the first embodiment and the second embodiment will be omitted and different structures will be mainly described.

<Structure>

In the above first embodiment, the negative power input terminal of the operational amplifier 321 is connected to the ECU ground. The second embodiment is different from the first embodiment in that a combustion pressure sensor is of the second embodiment has the negative power input terminal of the operational amplifier 321 connected to the chassis ground. In the first embodiment, the amplifying unit 33 including the non-inverting amplifying circuit is provided. The second embodiment is different from the first embodiment in that an amplifying unit 35 including a differential amplifying circuit is provided instead of the amplifying unit 33. The second embodiment is different from the first embodiment in that a second reference voltage generating unit 36 generating a reference voltage VF2 based on the ECU ground as a reference and providing the reference voltage VF2 to the amplifying unit 35 is added.

Hereinafter, similar structures to the first embodiment will be designated by the same symbols to omit the descriptions thereof, and the different points will be mainly described.

Figure 4:
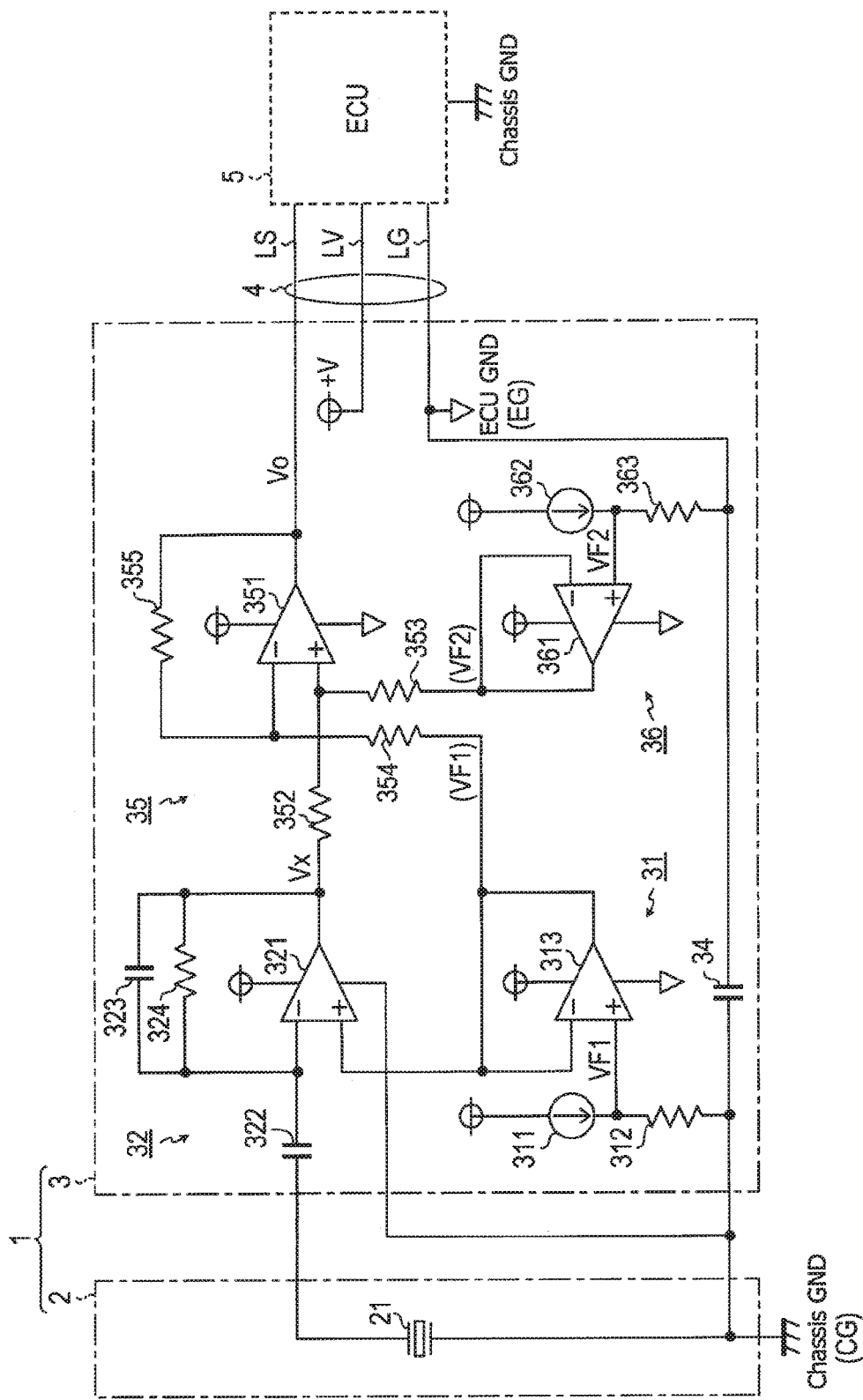
FIG. 4 is a circuit diagram illustrating a structure of a combustion pressure sensor with a built-in charge amplifier of a second embodiment.

As shown in FIG. 4, the second reference voltage generating unit 36, similarly to the reference voltage generating unit 31, includes a constant current circuit 362 and a resistor 363 providing a voltage generating circuit, and an operational amplifier 361 providing a voltage follower circuit. Differently from the reference voltage generating unit 31, an end of the voltage generating circuit adjacent to the resistor 363 is connected to the ECU ground instead of the chassis ground. Although the reference voltage VF2 has the same value as the reference voltage VF1, the reference voltage VF2 and the reference voltage VF1 are different because the reference voltage VF2 is generated based on the ECU ground as a reference and the reference voltage VF1 is generated based on the chassis ground as a reference.

The amplifying unit 35 includes an operational amplifier 351 and resistors 352, 353, 534 and 355. The operational amplifier 351 has a non-inverted input terminal to which the conversion voltage Vx outputted from the voltage converting unit 32 is applied through the resistor 352, and to which the second reference voltage VF2 outputted from the second reference voltage generating unit 36 through the resistor 353 is applied through the resistor 353. The operational amplifier 351 has an inverted input terminal to which the reference voltage VF1 outputted from reference voltage generating unit 31 is applied through the resistor 354. The resistor 355 is connected between the inverted input terminal and the output terminal of the operational amplifier 351. That is, the amplifying unit 35 forms a well-known differential amplifying circuit that amplifies the difference between the conversion voltage Vx and the reference voltage VF1.

Since the negative power terminal of the operational amplifier 321 is connected to the chassis ground, the conversion voltage Vx outputted from the voltage converting unit 32 has a value in which the potential difference of the chassis ground varying from the ECU ground is superimposed on the ECU ground as noise components. However, the amplifying unit 35 amplifies the difference between the conversion voltage Vx and the reference voltage VF1 having a value in which the similar noise components are superimposed on the ECU ground. Therefore, in the detection signal Vo outputted from the amplifying unit 35, the noise components included in the conversion voltage Vx and the reference voltage VF1 are restricted (i.e., canceled).

<Effects>

According to the combustion pressure sensor is of the second embodiment, the following effects can be achieved in addition to the effects of the first embodiment.

In the combustion pressure sensor 1a, the negative power terminal of the operational amplifier 321 is connected to the chassis ground instead of the ECU ground to secure a route in which the signal generated in the piezoelectric element 21 returns to the chassis ground. As such, a capacity of the ground separating capacitor 34 can be decreased, or the ground separating capacitor 34 can be omitted in some cases.

Other Embodiment

Although the embodiments of the present disclosure are described hereinabove, the present disclosure is not limited to the embodiments described above, and the present disclosure can be changed in various other ways.

Figure 5:
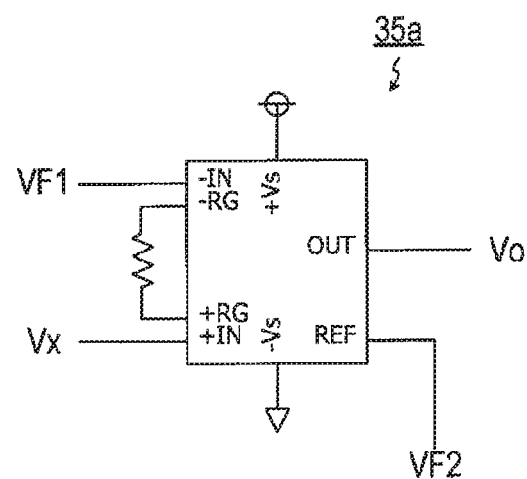
FIG. 5 is a circuit diagram illustrating other example of an amplifying unit of the second embodiment.

(1) In the above second embodiment, the differential amplifying circuit mainly including the operational amplifier 351 is employed as the amplifying unit 35. However, a well-known instrumentation amplifier connected as shown in FIG. 5 may be employed as the operational amplifier 351. Since the instrumentation amplifier has high cancelling rate for cancelling in-phase signals, the instrumentation amplifier can restrict the noise entering from the chassis ground more effectively.

(2) The elements of the present disclosure are just conceptional elements, and the present disclosure is not limited to the elements. For example, a function of one of the elements may be dispersed in plural elements, or functions of the plural elements may be combined in the one of the elements. Also, at least one of the elements of the above embodiments may be replaced by a well-known element having the similar function. Furthermore, at least one of the elements of the above embodiments may be added to the other embodiments, or at least one of the elements of the above embodiments may be replaced in the other embodiments.

The invention claimed is:

1. A combustion pressure sensor comprising:
    a sensor body including a piezoelectric element having a ground side end connected to a chassis ground through a housing, and detecting a pressure in a combustion chamber of an engine; and
    a charge amplifier including at least a voltage converting unit that converts an output of the sensor body into a voltage signal and a reference voltage generating unit that generates a reference voltage for being supplied to the voltage converting unit, and operating on a power supplied from a signal processing unit disposed outside of the charge amplifier, wherein
    the reference voltage generating unit includes a voltage generating circuit having a constant current circuit and a resistor connected in series with each other,
    one end of the voltage generating circuit is connected to a power supply line extending from the signal processing unit,
    the other end of the voltage generating circuit is connected to the ground side end of the piezoelectric element, and
    the ground side end of the piezoelectric element and a ground line employed for power supplying from the signal processing unit are connected through a ground separating capacitor.

2. The combustion pressure sensor according to claim 1, wherein
    a ground of the voltage converting unit is connected to the ground side end of the piezoelectric element.

3. The combustion pressure sensor according to claim 2, wherein
    the charge amplifier further includes an amplifying unit that differentially amplifies the voltage signal outputted from the voltage converting unit and the reference voltage generated in the reference voltage generating unit to generate a detection signal indicative of a detected combustion pressure in the combustion chamber.

4. The combustion pressure sensor according to claim 1, wherein
    the reference voltage generating unit supplies the reference voltage generated in the voltage generating circuit through a voltage follower circuit.

5. The combustion pressure sensor according to claim 3, further comprising:
    an engine control unit configured to receive and process the detection signal.

6. The combustion pressure sensor according to claim 1, wherein
    an end of the ground separating capacitor connected to the ground side end of the piezoelectric element is connected to the other end of the voltage generating circuit connected to the ground side end of the piezoelectric element.

* * * * *